United States Patent
Chu et al.

(10) Patent No.: US 9,000,881 B2
(45) Date of Patent: Apr. 7, 2015

(54) SURFACE MOUNTABLE OVER-CURRENT PROTECTION DEVICE

(71) Applicants: Fu Hua Chu, Taipei (TW); David Shau Chew Wang, Taipei (TW); Chun Teng Tseng, Sanwan Township, Miaoli County (TW); Yi An Sha, New Taipei (TW)

(72) Inventors: Fu Hua Chu, Taipei (TW); David Shau Chew Wang, Taipei (TW); Chun Teng Tseng, Sanwan Township, Miaoli County (TW); Yi An Sha, New Taipei (TW)

(73) Assignee: Polytronics Technology Corp., Hsinchu (TW)

( * ) Notice: Subject to any disclaimer, the term of this patent is extended or adjusted under 35 U.S.C. 154(b) by 120 days.

(21) Appl. No.: 13/901,068

(22) Filed: May 23, 2013

(65) Prior Publication Data

US 2014/0063671 A1    Mar. 6, 2014

(30) Foreign Application Priority Data

Sep. 6, 2012    (TW) .............................. 101132657 A (51) Int. Cl.
| | | |
|---|---|---|
| *H01C 7/10* | (2006.01) | |
| *H01C 7/13* | (2006.01) | |
| *H02H 3/08* | (2006.01) | |
| *H01C 7/12* | (2006.01) | |
| *H02H 9/04* | (2006.01) | |

(52) U.S. Cl.
CPC . *H02H 3/08* (2013.01); *H01C 7/12* (2013.01); *H02H 9/044* (2013.01)

(58) Field of Classification Search
CPC ............... H01C 17/0652; H01C 17/06526; H01C 17/06566; H01C 1/08; H01C 1/1406; H01C 7/021; H01C 7/027; H01C 7/12; H01C 7/02; H01C 1/028
USPC .................................................. 338/22 R, 13
See application file for complete search history.

(56) References Cited

U.S. PATENT DOCUMENTS

| | | |
|---|---|---|
| 5,025,271 A | 6/1991 | Baker et al. |
| 5,089,801 A | 2/1992 | Chan et al. |
| 5,303,138 A | 4/1994 | Rozman |
| 5,327,333 A | 7/1994 | Boylan et al. |
| 5,636,107 A | 6/1997 | Lu et al. |
| 5,663,876 A | 9/1997 | Newton et al. |
| 5,699,607 A | 12/1997 | McGuire et al. |
| 5,734,563 A | 3/1998 | Shinada |
| 5,831,510 A | 11/1998 | Zhang |
| 5,852,397 A | 12/1998 | Chan et al. |
| 5,864,281 A | 1/1999 | Zhang et al. |
| 5,872,705 A | 2/1999 | Loftus, Jr. et al. |

(Continued)

*Primary Examiner* — Kyung Lee
(74) *Attorney, Agent, or Firm* — Egbert Law Offices, PLLC (57) ABSTRACT

A surface-mountable over-current protection device comprises a PTC material layer, first and second conductive layers, first and second electrodes, first and second electrically conductive connecting members. The PTC material layer has a resistivity less than 0.18 Ω-cm. The conductive layers are in contact with opposite surfaces of the PTC material layer. The first electrode comprises pair of first metal foils and is insulated from the second conductive layer. The second electrode comprises a pair of second metal foils and is insulated from the first conductive layer. The first electrically conductive connecting member connects to the first metal foils and conductive layer. The second electrically conductive connecting member connects to the second metal foils and conductive layer. The first electrically conductive connecting member comprises 40%-100% by area of the first lateral surface, and the second electrically conductive connecting member comprises 40%-100% by area of the second lateral surface.

17 Claims, 6 Drawing Sheets

(56) References Cited

U.S. PATENT DOCUMENTS

| | | | |
|---|---|---|---|
| 5,876,842 A | 3/1999 | Duffy et al. | |
| 5,884,391 A | 3/1999 | McGuire et al. | |
| 5,900,800 A | 5/1999 | McGuire et al. | |
| 5,973,939 A | 10/1999 | Tan | |
| 6,020,808 A * | 2/2000 | Hogge | 338/22 R |
| 6,023,403 A | 2/2000 | McGuire et al. | |
| 6,055,782 A | 5/2000 | Morton et al. | |
| 6,061,253 A | 5/2000 | Igarashi et al. | |
| 6,157,289 A * | 12/2000 | Kojima et al. | 338/22 R |
| 6,377,467 B1 | 4/2002 | Chu et al. | |
| 6,377,476 B1 | 4/2002 | Fraidlin et al. | |
| 6,480,094 B1 * | 11/2002 | Chen et al. | 338/328 |
| 7,026,583 B2 * | 4/2006 | Tu et al. | 219/541 |
| 2001/0015688 A1 * | 8/2001 | Li et al. | 338/22 R |
| 2010/0134942 A1 * | 6/2010 | Wang et al. | 361/93.7 |

* cited by examiner

SURFACE MOUNTABLE OVER-CURRENT PROTECTION DEVICE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to an over-current protection device, and more particularly to a surface-mountable over-current protection device.

2. Description of Related Art Including Information Disclosed Under 37 CFR 10.97 and 37 CFR 1.98

Over-current protection devices are used for protecting circuitries from damage resulted from over-heat or over-current. An over-current protection device usually contains two electrodes and a resistive material disposed therebetween. The resistive material has positive temperature coefficient (PTC) characteristic that the resistance thereof remains extremely low at room temperature and instantaneously increases to thousand times when the temperature reaches a critical temperature or the circuit has over-current, so as to suppress over-current and protect the cell or the circuit device. When the resistive material gets back to the room temperature or over-current no longer exists, the over-current protection device returns to be of low resistance and as a consequence the circuitry again operate normally. In view of the reusable property, the PTC over-current protection devices can replace traditional fuses, and have been widely applied to high density circuits.

Figure 1A:
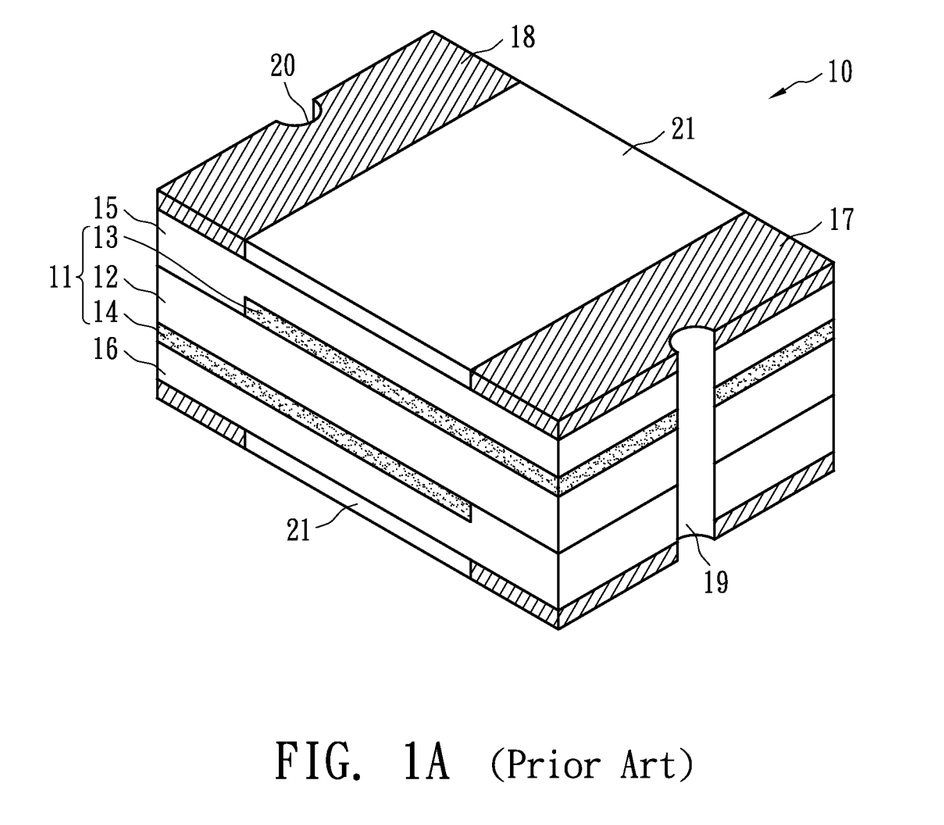
FIGS. 1A to 1C show a known over-current protection device.

Referring to FIG. 1A, U.S. Pat. No. 6,377,467 disclosed a surface-mountable over-current protection device 10 containing a resistive device 11, a first electrode 17, a second electrode 18, insulating layers 15 and 16, a first conductive via 19 and a second conductive via 20. The resistive device 11 contains a first conductive member 13, a second conductive member 14 and a PTC material layer 12. The PTC material layer 12 is stacked between the first conductive layer 13 and the second conductive layer 14, and extends along with the conductive members 13 and 14 in the horizontal direction to form a laminated structure. The conductive vias 19 and 20 extend vertically, and may be plated through holes (PTH) formed by laser or mechanical drilling to connect the conductive layers 13, 14 and the electrodes 17, 18. Owing to small contact areas of the PTH 19 and 20 and the conductive layers 13 and 14, the contact resistances are large. Therefore, it is difficult to further decrease the resistance of the device.

Figure 1B:
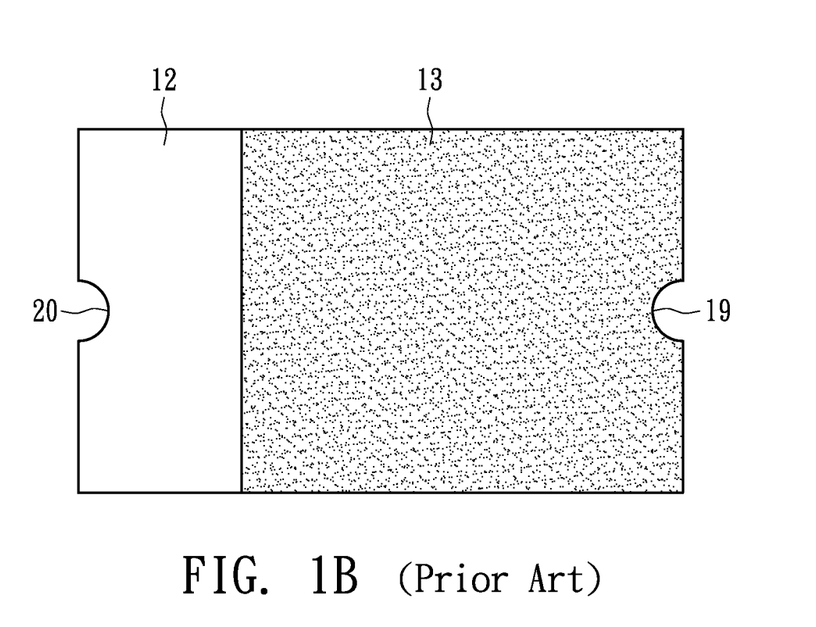
Figure 1C:
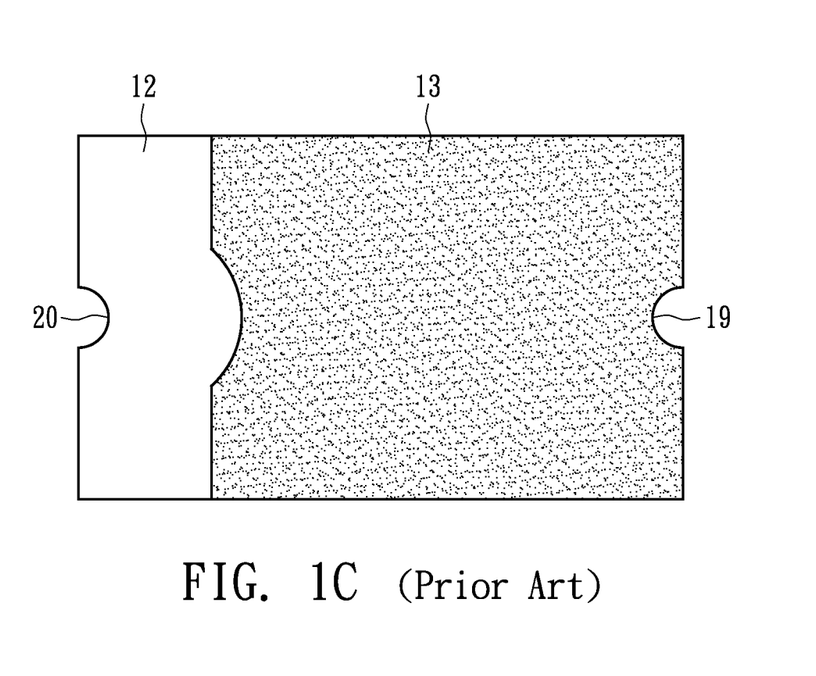

To avoid circuit short between conductive via 19 and the conductive member 14 or the conductive via 20 and the conductive member 13 caused by the event of drilling misalignment, the conductive members 13 and 14 have to be apart from the corresponding lateral surfaces. FIG. 1B exemplifies that conductive member 13 is apart from the conductive via 20. Alternatively, the conductive members 13 may have an edge surrounding the via 20 to avoid circuit short, as shown in FIG. 1C. As a consequence, the effective area of the resistive device 11 is, however, diminished, inducing high resistance of the over-current protection device 10.

BRIEF SUMMARY OF THE INVENTION

The present application relates to an over-current protection device, and more particularly to a surface-mountable over-current protection device in which the contact resistance between a PTC device and external electrodes decreases effectively, thereby decreasing the entire resistance of the over-current protection device.

According to an embodiment of the present application, a surface-mountable over-current protection device has an upper surface, a lower surface, a first lateral surface and a second lateral surface, the first lateral surface is opposite to the second lateral surface. The surface-mountable over-current protection device comprises a PTC material layer, a first conductive layer, a second conductive layer, a first electrode, a second electrode, a first electrically conductive connecting member and a second electrically conductive connecting member. The PTC material layer contains crystalline polymer and conductive filler, e.g., metal or conductive ceramic powder, dispersed therein, and is of a resistivity less than 0.18 $\Omega$-cm. The first and second conductive layers are in physical contact with two opposite surfaces of the PTC material layer, respective. The first electrode comprises a pair of first metal foils formed at the upper and lower surfaces of the device, and is electrically connected to the first conductive layer and is insulated from the second conductive layer. The second electrode comprises a pair of second metal foils formed at the upper and lower surfaces of the device, and is electrically connected to the second conductive layer and is insulated from the first conductive layer. The first electrically conductive connecting member is formed at the first lateral surface, and connects to the first metal foils and the first conductive layer. The second electrically conductive connecting member is formed at the second lateral surface, and connects to the second metal foils and the second conductive layer. The first electrically conductive connecting member comprises 40%-100% by area of the first lateral surface, and the second electrically conductive connecting member comprises 40%-100% by area of the second lateral surface.

In an embodiment, the first and second electrically conductive connecting members are conductive metal planes formed at the first and second lateral surfaces, respectively, and may be full-face conductive metal planes in particular. In an embodiment, the first metal foils and the first electrically conductive connecting member constitute a first end terminal capping the first lateral surface, whereas the second metal foils and the second electrically conductive connecting member constitute a second end terminal capping the second lateral surface.

In an embodiment, the first or second electrically conductive connecting member may comprise at least two conductive vias extending in a vertical direction. In an embodiment, the cross-sectional view of the conductive via is semi-circular.

By means of the increase of the contact areas between the electrically conductive connecting members and the electrodes and/or the conductive members of the PTC device, the contact resistance thereof can be diminished; thereby decreasing the resistance of the over-current protection device. Moreover, the use of metal or ceramic conductive powder as the conductive filler can further decrease the resistance of the PTC material. In other words, the structural resistance and the material resistance of the over-current protection device can be decreased according to the present application, so that the entire device resistance can decrease effectively.

BRIEF DESCRIPTION OF THE SEVERAL VIEWS OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 2:
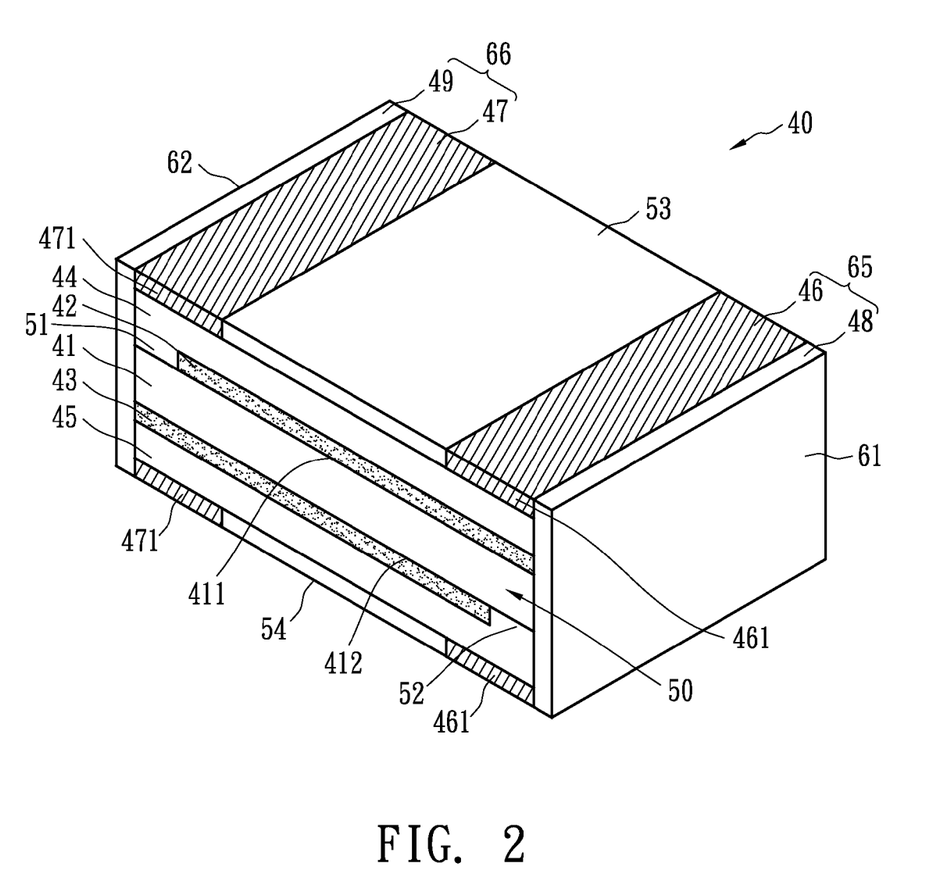
FIGS. 2 to 4 show an over-current protection device in accordance with a first embodiment of the present application.

FIG. 2 shows a three-dimensional view of an over-current protection device in accordance with an embodiment of the present application. An over-current protection device 40 is of a rectangular cuboid having opposite upper and lower surfaces and opposite lateral surfaces 61 and 62. The lateral surfaces 61 and 62 connect the upper and lower surfaces of the device 40. The over-current protection device 40 comprises a PTC material layer 41, a first conductive layer 42, a second conductive layer 43, a first insulation layer 44, a second insulation layer 45, a first electrode 46, a second electrode 47, and electrically conductive connecting member 48 and 49. The PTC material layer 41 has opposite first surface 411 and second surface 412. The first conductive member 42 is in physical contact with the first surface 411 of the PTC material layer 41, and the second conductive member 43 is in physical contact with the second surface 412 of the PTC material layer 41. More specially, the conductive layers 42, 43 and the PTC material layer 41 laminated therebetween constitute a PTC device 50. The first electrode 46 comprises a pair of first metal foils 461 formed at the upper and lower surfaces of the device 40, and is electrically connected to the first conductive layer 42 and insulated from the second conductive layer 43. The second electrode 47 comprises a pair of second metal foils 471 formed at the upper and lower surfaces of the device 40, and is electrically connected to the second conductive layer 43 and insulated from the first conductive layer 42. The first electrically conductive connecting member 48 is formed at the first lateral surface 61, and connects to the first metal foils 461 and the first conductive layer 42. The second electrically conductive connecting member 49 is formed at the second lateral surface 62, and connects to the second metal foils 471 and the second conductive layer 43.

The first insulation layer 44 is formed on the first conductive layer 42, and the second insulation layer 45 is funned on the second conductive layer 43. The metal foils 461 and 471 at the upper surface are formed on the first insulation layer 44, and the metal foils 461 and 471 at the lower surface are formed on the second insulation layer 45.

More specifically, the first electrode 46 and the electrically conductive connecting member 48 form an end terminal 65, and in an embodiment the end terminal 65 caps the first lateral surface 61. The second electrode 47 and the electrically conductive connecting member 49 form another end terminal 66, and in an embodiment the end terminal 66 caps the second lateral surface 62.

In an embodiment, a first solder mask 53 is formed on the first insulation layer 44 between the first and second metal foils 461 and 471 at the upper surface. A second solder mask 54 is formed on the second insulation layer 45 between the first and second metal foils 461 and 471 at the lower surface.

Figure 3:
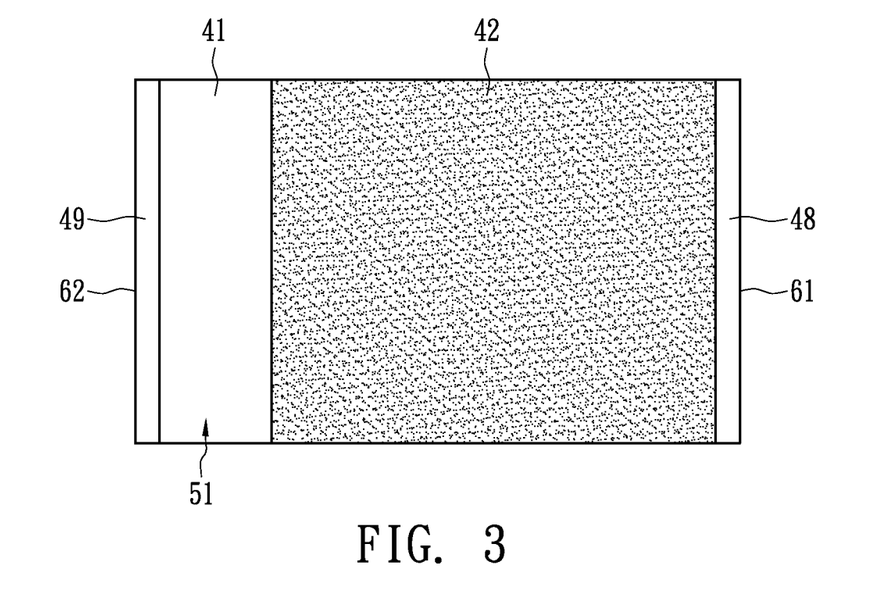
Figure 4:
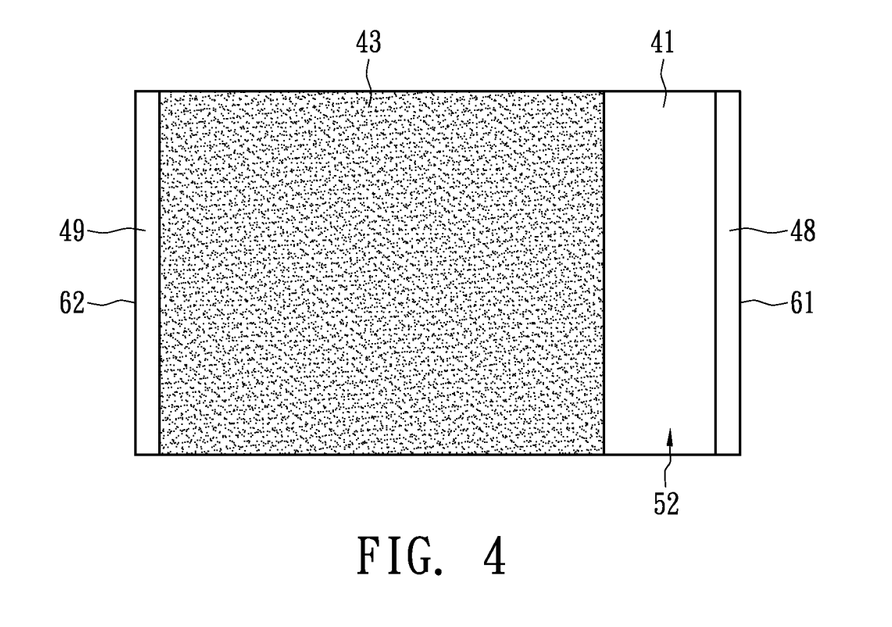

FIG. 3 is a top view of the first conductive layer 42 and the PTC material layer 41. FIG. 4 is a bottom view of the second conductive layer 43 and the PTC material layer 41. Referring to FIGS. 2 and 3, the second lateral surface 62 is opposite to the first lateral surface 61. The first conductive layer 42 extends and connects to the electrically conductive connecting member 48, and is isolated from the electrically conductive connecting member 49 by a separation 51, e.g., a gap. Referring to FIGS. 2 and 4, the second conductive layer 43 extends and connects to the electrically conductive connecting member 49, and is isolated from the electrically conductive connecting member 48 by a separation 52, e.g., a gap. The PTC material layer 41 contains an upper surface 411 and a lower surface 412 on which the conductive layers 42 and 43 are disposed and extend to the electrically conductive connecting members 48 and 49, respectively. In an embodiment, the conductive layers 42 and 43 can be made from metal foils of which the separations 51 and 52 may be formed by laser cutting, chemical etching or mechanical machining. The separations 51 and 52 are not restricted to those embodiments shown in the drawings, other shapes or figures capable of providing isolation can be used for the present application also.

The electrically conductive connecting members 48 and 49 are formed at the lateral surfaces 61 and 62 in place of PTH, thereby decreasing the probability of circuit short. According to this design, the separations 51 and/or 52 can be much close to the lateral surfaces 62 and/or 61, i.e., smaller separations 51 and 52 are obtainable, and as a result the effective areas of the conductive layers 42 and 43 of the PTC device 50 will be increased. In an embodiment, the separation 51 or 52 is equal to or larger than 0.1 mm, or equal to or larger than 0.13 mm or 0.16 mm in particular.

The electrically conductive connecting members 48 and 49 may be conductive metal planes formed by plating conductive films on the lateral surfaces 61 and 62. In an embodiment, the lateral surfaces 61 and 62 are fully electroplated with conductive films. That is, the electrically conductive connecting member 48 comprises 100% by area of the first lateral surface 61, and the electrically conductive connecting member 49 comprises 100% try area of the second lateral surface 62 as shown in FIG. 2. In other words, the first electrically conductive connecting member 48 and second electrically conductive connecting member 49 are full-face conductive planes. However, the electrically conductive connecting member 48 or 49 may not fully, occupy the entire lateral surface 61 or 62. Instead, the electrically conductive connecting member 48 or 49 may be formed at a part of the lateral surface 61 or 62. However, the conductive connecting member 48 has to comprise at least 40% by area of the lateral surface 61. The area ratio may be equal to or larger than 50%, 60%, 70%, or 80%, or 90%. Similarly, the conductive connecting member 49 comprises at least 40% by area of the lateral surface 62.

In addition to the conductive metal plane, the electrically conductive connecting member may comprise plural conductive vias. The electrically conductive connecting member comprising two conductive vias is exemplified as follows.

Figure 5:
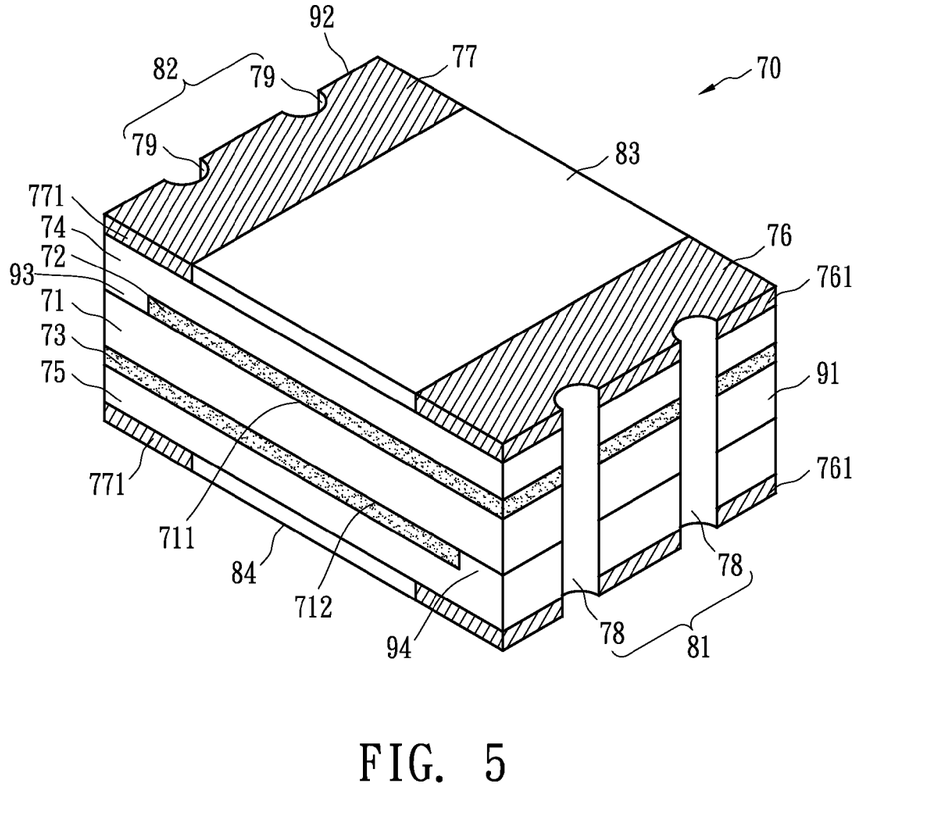
FIGS. 5 and 6 show an over-current protection device in accordance with a second embodiment of the present application.

Referring to FIG. 5, an over-current protection device 70 is of a rectangular cuboid having opposite upper and lower surfaces and opposite lateral surfaces 91 and 92. The lateral surfaces 91 and 92 connect the upper and lower surfaces. The over-current protection device 70 comprises a PTC material layer 71, a first conductive layer 72, a second conductive layer 73, a first insulation layer 74, a second insulation layer 75, a first electrode 76, a second electrode 77, and electrically conductive connecting member 81 and 82. The PTC material layer 71 has opposite first surface 711 and second surface 712. The first conductive member 72 is in physical contact with the first surface 711 of the PTC material layer 71, and the second conductive member 73 is in physical contact with the second surface 712 of the PTC material layer 71. The first electrode 76 comprises a pair of first metal foils 761 at the upper and lower surfaces of the device 70 and is electrically connected to the first conductive layer 72 and insulated from the second conductive layer 73. The second electrode 77 comprises a pair of second metal foils 771 at the upper and lower surfaces of the device 70, and is electrically connected to the second conductive layer 73 and insulated from the first conductive layer 72. The electrically conductive connecting member 81 comprises at least two conductive vias 78 at the first lateral surface 91, and connects to the first metal foils 761 and the first conductive layer 72. The electrically conductive connecting member 82 comprises at least two conductive through holes 79 at the second lateral surface 92, and connects to the second metal foils 771 and the second conductive layer 73. The first insulation layer 74 is formed on the first conductive layer 72, and the second insulation layer 75 is formed on the second conductive layer 73. The metal foils 761 and 771 at the upper surface are formed on the first insulation layer 74, and the metal foils 761 and 771 at the lower surface are formed on the second insulation layer 75. In an embodiment, a first solder mask 83 is formed on the first insulation layer 74 between the first and second metal foils 761 and 771 at the upper surface. A second solder mask 84 is formed on the second insulation layer 75 between the first and second metal foils 761 and 771 at the lower surface. The first conductive layer 72 extends and connects to the first lateral surface 91, and is isolated from the second lateral surface 92 by a separation 93. The second conductive layer 73 extends and connects to the second lateral surface 92, and is isolated from the first lateral surface 91 by a separation 94. In an embodiment, the separation 93 or 94 is equal to or larger than 0.1 mm, or not less than 0.13 mm or 0.16 mm in particular.

Figure 6:
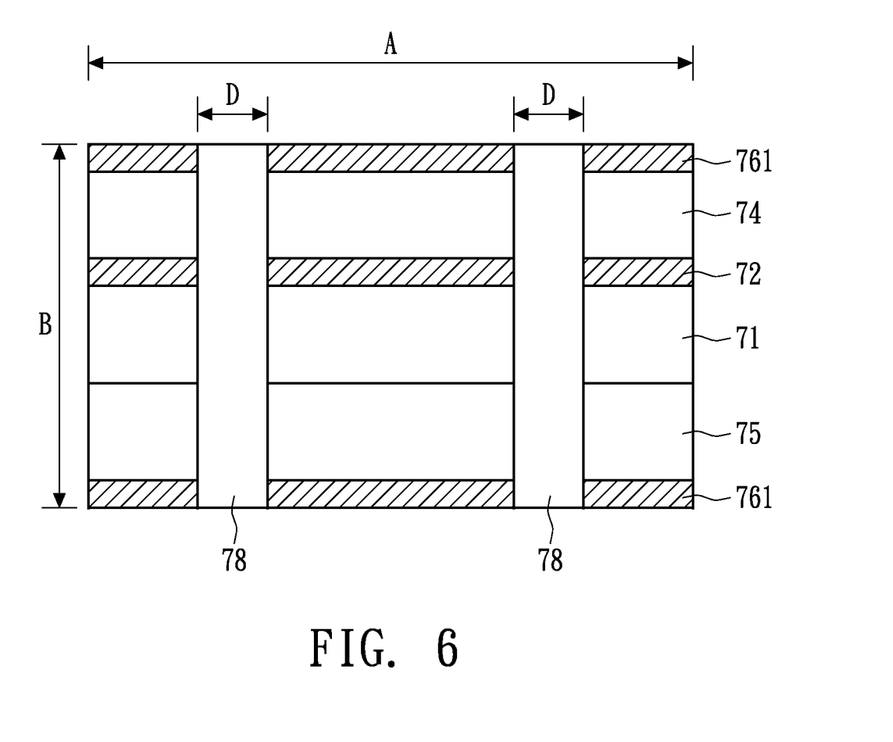

FIG. 6 shows a planar view of the lateral surface 91. The lateral surface 91 has a width "A" and a height "B," and therefore the area of the lateral surface 91 is equal to A×B. The diameter of the conductive via 78 is "D," so that the surface area of each of the conductive via 78 is 3.14×D/2×B. Therefore, the ratio "R" of the area of the electrically conductive connecting member 81 comprising two conductive vias 78 to the area of the lateral surface 91 is equal to 2×(3.14×D/2×B)/(A×B). The ratio "R" is ranging from 40% to 100%, and may be 50%, 60%, 70%, 80% or 90% in particular.

More specifically, there are at least two conductive vias 78 or 79 to increase the contact area with the electrodes 76 or 77, and/or the contact area with the conductive layers 72 or 73. The increase of the contact areas between the conductive vias 78, 79 and the conductive layers 72 and 73 is more crucial to decrease the contact resistance.

In addition to the structural modification to decrease the contact resistance between the electrically conductive connecting members and the conductive layers and/or the electrodes, low-resistance conductive filler may be used in the PTC material layer to further decrease entire resistance of the over-current protection device.

The PTC material layers 41 and 71 contain crystalline polymer and conductive filler and therefore exhibit PTC characteristic. The crystalline polymer material layer may comprise high-density polyethylene (HDPE), medium-density polyethylene, low-density polyethylene (LDPE), polypropylene, polyvinyl chloride, polyvinyl fluoride, copolymer of ethylene and acrylic acid, copolymer of ethylene and acrylic resin, copolymer of ethylene and vinyl alcohol, or the combination thereof. The conductive filler may be metal powder or conductive ceramic carbide powder of a resistivity less than 500 Ω-cm. The conductive filler may comprise nickel, cobalt, copper, iron, tin, lead, silver, gold, platinum, tungsten carbide, vanadium carbide, titanium carbide, boron carbide, silicon carbide, germanium carbide, tantalum carbide, zirconium carbide, chromium carbide, molybdenum carbide or the mixture, alloy, solid solution or core-shell thereof. By using the conductive filler with low resistivity, the resistivity of the PTC material layer 41 or 71 is less than 0.18 Ω-cm.

Table 1 shows the resistance test results of the over-current protection devices with a single PTH and full-face conductive metal planes at two opposite lateral surfaces. The single PTH comprises about 15-20% by area of the lateral surface. The over-current protection devices use tungsten carbide (WC) and titanium carbide (TiC) as the conductive filler, and the corresponding tests have the same ingredients and percentages. Ri is the initial resistance of the device; R1 is the resistance when the device is recovered after tripping once; R2 is the resistance when the device is recovered after tripping twice; R3 is the resistance of the device further undergoing baking at 160° C. for 20 minutes.

TABLE 1

| Conductive connecting member | Conductive filler | Ri (mΩ) | R1 (mΩ) | R2 (mΩ) | R3 (mΩ) |
|---|---|---|---|---|---|
| Single PTH | WC | 5.32 | 7.74 | 8.02 | 7.74 |
| Full-face conductive plane | TiC | 4.22 | 6.28 | 6.26 | 6.41 |
| Single PTH | WC | 5.2 | 6.15 | 7.24 | 7.64 |
| Full-face conductive plane | TiC | 4.07 | 5.15 | 5.92 | 6.38 |

As seen from Table 1, regardless of the use of tungsten carbide or titanium carbide, the devices using full-face conductive planes can decrease the resistances by approximately 17-25% in comparison with the single PTH. Moreover, the over-current protection device exhibits excellent resistance repeatability.

The embodiments mentioned above relates to the device containing a single PTC material layer. In practice, the device may contain plural PTC material layers in parallel connection. For example, the present application may apply to an over-current protection device containing two PTC material layers connected in parallel, as shown in the U.S. Pat. No. 6,377,467, by adopting, the criteria that the ratio of the area of the conductive connecting member to the area of the lateral surface is than a threshold value specified by the present application.

According to the present application, the increase of the contact area between the electrically conductive connecting members and the conductive layers or the electrodes can decrease the contact resistance. Moreover, the resistance of the over-current protection device can be further decreased by using low-resistivity conductive fillers.

The above-described embodiments of the present invention are intended to be illustrative only. Numerous alternative embodiments may be devised by persons skilled in the art without departing from the scope of the following claims.

We claim:

1. A surface-mountable over-current protection device having opposite upper and lower surfaces, a first lateral surface and a second lateral surface, the first and second lateral surfaces being opposite to each other and interconnecting the upper and lower surfaces; the over-current protection device comprising:
   a PTC material layer having opposite first and second surfaces and comprising crystalline polymer and conductive filler dispersed therein, the PTC material layer having a resistivity less than 0.18 $\Omega$-cm;
   a first conductive layer in physical contact with the first surface of the PTC material layer;
   a second conductive layer in physical contact with the second surface of the PTC material layer;
   a first electrode comprising a pair of first metal foils at the upper and lower surfaces, and being electrically connected to the first conductive layer and isolated from the second conductive layer;
   a second electrode comprising a pair of second metal foils at the upper and lower surfaces, and being electrically connected to the second conductive layer and isolated from the first conductive layer; and
   a first electrically conductive connecting member formed at the first lateral surface and connecting to the first metal foils and the first conductive layer;
   a second electrically conductive connecting member formed at the second lateral surface and connecting to the second metal foils and the second conductive layer;
   wherein the first electrically conductive connecting member comprises 40%-100% by area of the first lateral surface, and the second electrically conductive connecting member comprises 40%-100% by area of the second lateral surface.

2. The surface-mountable over-current protection device of claim 1, further comprising:
   a first insulation layer disposed on the first conductive layer; and
   a second insulation layer disposed on the second conductive layer;
   wherein the first and second metal foils at the upper surface are disposed on the first insulation layer, and the first and second metal foils at the lower surface are disposed on the second insulation layer.

3. The surface-mountable over-current protection device of claim 1, wherein the first electrically conductive connecting member and the second electrically conductive connecting member are conductive metal planes formed at the first lateral surface and the second lateral surface, respectively.

4. The surface-mountable over-current protection device of claim 1, wherein the first electrically conductive connecting member and second electrically conductive connecting member are full-face conductive metal planes at the first lateral surface and the second lateral surface, respectively.

5. The surface-mountable over-current protection device of claim 3, wherein the first conductive layer extends and connects to the first electrically conductive connecting member and is isolated from the second electrically conductive connecting member by a first separation; the second conductive layer extends and connects to the second electrically conductive connecting member and is isolated from the second electrically conductive connecting member by a second separation.

6. The surface-mountable over-current protection device of claim 5, wherein the first separation or the second separation is equal to or larger than 0.1 mm.

7. The surface-mountable over-current protection device of claim 1, wherein at least one of the first and second electrically conductive connecting members comprises at least two conductive vias extending vertically.

8. The surface-mountable over-current protection device of claim 7, wherein the first conductive layer extends and connects to the first lateral surface and is isolated from the second lateral surface by a first separation; the second conductive layer extends and connects to the second lateral surface and is isolated from the first lateral surface by a second separation.

9. The surface-mountable over-current protection device of claim 7, wherein the conductive vias are semi-circular in a cross-sectional view.

10. The surface-mountable over-current protection device of claim 1, wherein the conductive filler comprises nickel, cobalt, copper, iron, tin, lead, silver, gold, platinum, tungsten carbide, vanadium carbide, titanium carbide, boron carbide, silicon carbide, germanium carbide, tantalum carbide, zirconium carbide, chromium carbide, molybdenum carbide, or the mixture, alloy, solid solution or core-shell thereof.

11. The surface-mountable over-current protection device of claim 1, wherein the crystalline polymer comprises high-density polyethylene, medium-density polyethylene, low-density polyethylene, polypropylene, polyvinyl chloride, polyvinyl fluoride, copolymer of ethylene and acrylic acid, copolymer of ethylene and acrylic resin, copolymer of ethylene and vinyl alcohol, or the combination thereof.

12. A surface-mountable over-current protection device having opposite upper and lower surfaces, a first lateral surface and a second lateral surface, the first and second lateral surfaces being opposite to each other and interconnecting the upper and lower surfaces; the over-current protection device comprising:
   a PTC device comprising a first conductive layer, as second conductive layer and a PTC material layer laminated therebetween, the PTC material layer comprising crystalline polymer and conductive filler dispersed therein and having a resistivity less than 0.18 $\Omega$-cm;
   a first insulation layer formed on the first conductive layer;
   a second insulation layer formed on the second conductive layer;
   a first end terminal comprising a pair of first metal foils formed at the upper and lower surfaces and a first electrically conductive connecting member formed at the first lateral surface, the first electrically conductive connecting member connecting to the first conductive layer and being isolated from the second conductive layer; and
   a second end terminal comprising a pair of second metal foils formed at the upper and lower surfaces and a second electrically conductive connecting member formed at the second lateral surface, the second electrically conductive connecting member connecting to the second conductive layer and being isolated from the first conductive layer;

wherein the first electrically conductive connecting member comprises 40%-100% by area of the first lateral surface, and the second electrically conductive connecting member comprises 40%-100% by area of the second lateral surface.

13. The surface-mountable over-current protection device of claim 12, wherein the first end terminal caps the first lateral surface, and the second end terminal caps the second lateral surface.

14. The surface-mountable over-current protection device of claim 12, wherein the first conductive layer extends and connects to the first electrically conductive connecting member and is isolated from the second electrically conductive connecting member by a first separation; the second conductive layer extends and connects to the second electrically conductive connecting member and is isolated from the first electrically conductive connecting member by a second separation.

15. The surface-mountable over-current protection device of claim 14, wherein the first separation or the second separation is equal to or larger than 0.1 mm.

16. The surface-mountable over-current protection device of claim 12, wherein at least one of the first and second electrically conductive connecting members comprises at least two conductive vias extending vertically.

17. The surface-mountable over-current protection device of claim 12, wherein the conductive filler comprises nickel, cobalt, copper, iron, tin, lead, silver, gold, platinum, tungsten carbide, vanadium carbide, titanium carbide, boron carbide, silicon carbide, germanium carbide, tantalum carbide, zirconium carbide, chromium carbide, molybdenum carbide, or the mixture, alloy, solid solution or core-shell thereof.

* * * * *